UNITED STATES PATENT OFFICE.

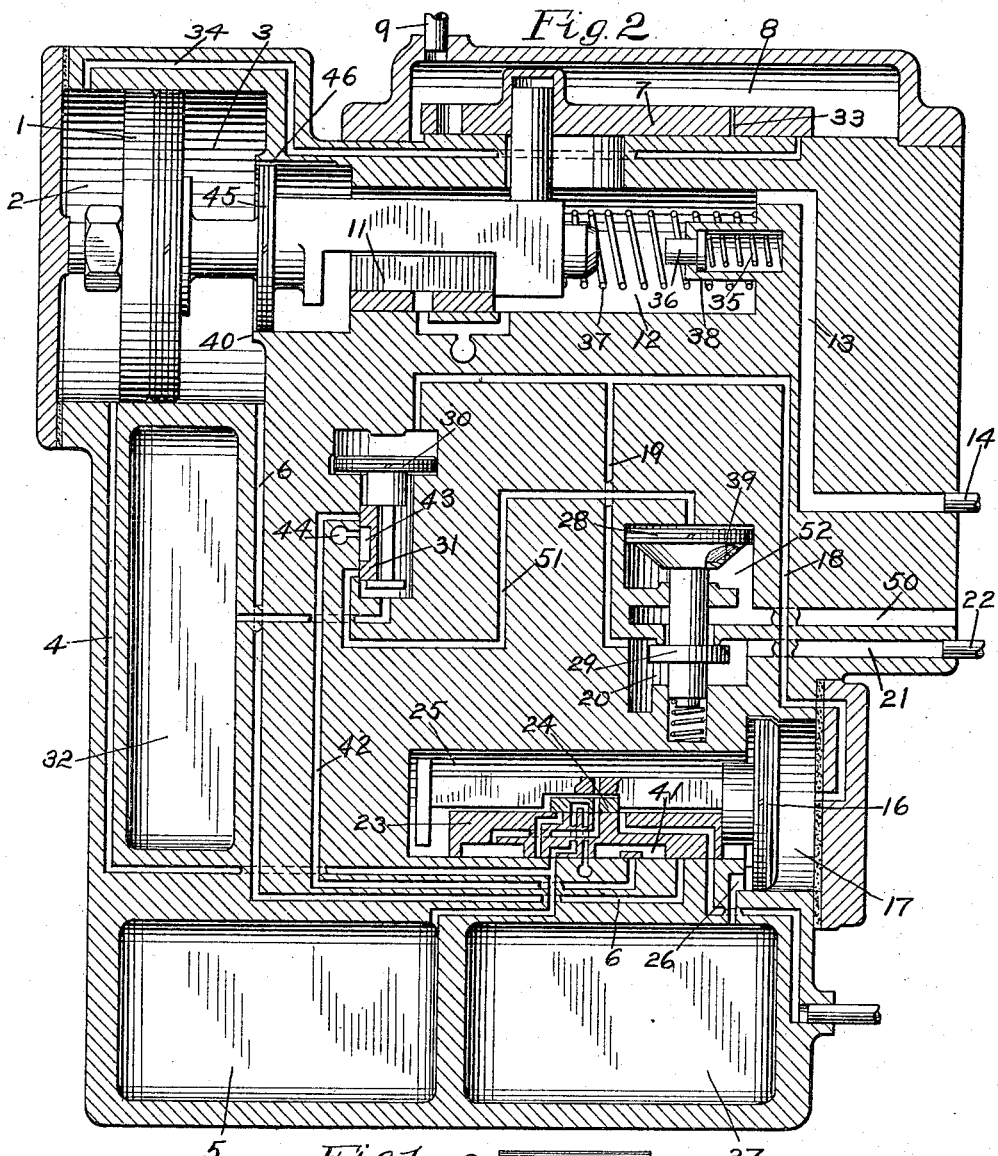

WALTER V. TURNER, OF WILKINSBURG, PENNSYLVANIA, ASSIGNOR TO THE WESTINGHOUSE AIR BRAKE COMPANY, OF WILMERDING, PENNSYLVANIA, A CORPORATION OF PENNSYLVANIA.

BRAKE-CONTROL-VALVE DEVICE.

1,187,569.   Specification of Letters Patent.   Patented June 20, 1916.

Application filed September 2, 1915. Serial No. 48,645.

*To all whom it may concern:*

Be it known that I, WALTER V. TURNER, a citizen of the United States, residing at Wilkinsburg, in the county of Allegheny and State of Pennsylvania, have invented new and useful Improvements in Brake-Control-Valve Devices, of which the following is a specification.

This invention relates to fluid pressure brakes, and more particularly to that type of brake controlling valve device employing a piston subject to the opposing pressures of an application chamber and the brake cylinder and valve means operated by said piston for controlling the admission and release of fluid under pressure to and from the brake cylinder.

With the above type of brake controlling valve device, there is provided differential piston heads in the application portion and when an emergency application of the brakes is effected, the space between the piston heads is vented to the atmosphere through ports controlled by the emergency valve device, in order to maintain the application valve parts in emergency position against a high brake cylinder pressure.

It may sometimes happen that leakage will occur from the application chamber, and particularly if the car should stand for some time with the brakes applied in emergency, this leakage may be sufficient to cause the application piston to be moved away from its emergency position by the higher brake cylinder pressure acting on the opposite side and this will permit fluid under pressure to flow through a groove provided around the small piston head and thence to the seat of the emergency valve device. Even though this flow is open to the exhaust, it may still be sufficient to lift the emergency slide valve from its seat, since the pressure above the valve has already been reduced to atmospheric pressure. If the emergency slide valve lifts from its seat in this manner, fluid can flow to the quick action piston and thereby cause same to reopen the quick action vent valve. Since the release of the brakes can not be made, because fluid supplied to increase the brake pipe pressure escapes to the atmosphere at the quick action vent valve.

In order to overcome the above described difficulty, the principal object of my invention is to provide means for automatically supplying fluid to the application chamber upon movement of the application valve parts from emergency position.

In the accompanying drawing Figure 1 is a diagrammatic view of a car air brake equipment embodying my improvement; and Fig. 2 a central sectional diagrammatic view of the control valve device showing the parts in normal release position.

As shown in Fig. 2 of the drawing, the control valve device may comprise an application valve mechanism of the type having two positions, one for effecting a service application of the brakes and the other for effecting an emergency application, to obtain a higher degree of brake cylinder pressure.

The application valve mechanism may comprise the usual application piston 1 dividing the piston chamber into two chambers 2 and 3, chamber 2 being connected through passage 4 to an application chamber 5, and chamber 3 to a passage 6; an application valve 7 contained in chamber 8, which is connected by pipe 9 to the main reservoir 10; and an exhaust valve 11 contained in chamber 12, which communicates through passage 13 and pipe 14 with the brake cylinder 15.

The equalizing portion may be of the usual construction, comprising a piston 16 contained in chamber 17 which is connected through passages 18 and 19, chamber 20, and passage 21 with the brake pipe 22, and a main slide valve 23 and graduating valve 24, both contained in chamber 25 which is connected by passage 26 with the pressure chamber 27. There may also be provided the usual quick action valve mechanism consisting of a piston 28 operating a valve 29 which is adapted to control communication from the brake pipe passage 21 to the quick action exhaust passage 50.

An emergency valve mechanism comprising a piston 30 and slide valve 31 is provided to control communication between a quick action chamber 32 and the quick action piston 28, and, (in conjunction with the equalizing slide valve 23) between chamber 3 and the atmosphere.

According to my invention there is provided an additional port 33 in the application valve 7 adapted to register with passage 34, leading from the application valve seat to chamber 2, when the application piston 1 moves a slight amount away from its emergency position. To define the position in which port 33 registers with passage 34, there is also provided a movable stop 35 actuated by spring 36.

In operation, the pressure chamber 27 is charged in the usual manner from the brake pipe through the feed groove around the equalizing piston 16, and when a gradual reduction in brake pipe pressure is made, the equalizing piston 16 with valves 23 and 24 will be shifted to service position and air admitted from the equalizing chamber 27 to the application chamber 5 and piston chamber 2, the application portion being thereby actuated to effect a service application of the brakes in the usual manner.

When a rapid reduction in brake pipe pressure is made, the equalizing parts will be moved to the same position as during a service application, and air is admitted to chamber 2 in the same manner. The emergency piston 30 and slide valve 31 will also be shifted to emergency position by the sudden reduction in brake pipe pressure in which air from the quick action chamber 32 is supplied through passage 51 to the top of piston 28, which is thereby moved downwardly and valve 29 opened to vent air from the brake pipe, said valve being returned to its seat by the spring when the quick action chamber air has drained to the atmosphere through the small hole 39 in piston 28. Chamber 3 is now open to the atmosphere through passage 6, cavity 41 in slide valve 23, passage 42, cavity 43 in slide valve 31 and exhaust port 44, and piston 1 is shifted to its seat 40 and the application valve 7 to its emergency position.

Although the equalized pressure in chamber 2 is the same in an emergency application as in a service application, a higher brake cylinder pressure can be obtained in an emergency application, since the chamber 3 is now open to the atmosphere, so that the movement of the parts is controlled by the pressure acting on the large area of piston 1 and opposed by brake cylinder pressure acting on the small area of piston 45. If the brakes remain thus applied for a considerable length of time and there happens to be a sufficient amount of leakage from chamber 2 so that the piston 1 moves away from its seat 40, port 33 in the application valve will register with passage 34 before groove 46 is reopened, and consequently the pressure in chamber 2 is restored by air direct from the main reservoir and piston 1 is again moved to its seat and the application valve 7 to its normal emergency position again.

While the application valve parts are in emergency position, springs 35 and 37 are both under compression, and when the piston is started toward release position as a result of leakage from chamber 2, there is a force exerted on the piston by both springs, but coincidently with the registration of port 33 with passage 34, the movable stop 36 will have come to rest against its casing 38 and the force driving the piston back is suddenly diminished, thus preventing any possibility of the application valve 7 moving beyond the position in which the maintaining ports are in registration.

Having now described my invention, what I claim as new and desire to secure by Letters Patent, is:

1. In a fluid pressure brake, the combination with a brake cylinder, of a piston subject to the opposing pressures of the brake cylinder and an application chamber, valve means operated by said piston for supplying fluid to the brake cylinder, and means adapted upon movement of the parts from application position for supplying fluid to the application chamber.

2. In a fluid pressure brake, the combination with a brake cylinder, of a piston subject to the opposing pressures of the brake cylinder and an application chamber, valve means operated by said piston for supplying fluid to the brake cylinder to effect an emergency application of the brakes, and means operated upon movement of the parts from emergency position for supplying fluid to the application chamber, to thereby effect the return movement of the parts to emergency position.

3. In a fluid pressure brake, the combination with a brake cylinder, of a piston subject to the opposing pressures of the brake cylinder and an application chamber, a valve operated by said piston for supplying fluid to the brake cylinder, and ports controlled by said valve for supplying fluid to the application chamber upon movement of the valve from application position toward release position.

4. In a fluid pressure brake, the combination with a brake pipe and brake cylinder, of a piston having differential piston heads subject to the opposing pressures of the brake cylinder and an application chamber, a valve operated by said piston for supplying fluid to the brake cylinder, an emergency valve device operated upon a sudden reduction in brake pipe pressure for venting air from the space between the piston heads, and ports controlled by said valve for supplying fluid to the application chamber upon movement from application position.

5. In a fluid pressure brake, the combination with a brake pipe and brake cylinder, of a piston having differential piston heads, a valve operated by said piston for supplying fluid to the brake cylinder, the piston having a service position in which fluid at brake cylinder pressure is supplied to the space between the piston heads and an emergency position in which fluid is vented from said space, an emergency valve device operated upon a sudden reduction in brake pipe pressure for venting fluid from said space, and means adapted upon movement of said valve from emergency position for supplying fluid to the application chamber.

6. In a fluid pressure brake, the combination with a brake cylinder, of a piston subject to the opposing pressures of the brake cylinder and an application chamber, a valve operated by said piston for supplying fluid to the brake cylinder, ports controlled by said valve for supplying fluid to the application chamber upon movement from application position, and a yielding resistance for opposing movement of the parts from the position for supplying fluid to the application chamber to the position for supplying fluid to the brake cylinder.

7. In a fluid pressure brake, the combination with a brake cylinder, of a piston subject to the opposing pressures of the brake cylinder and an application chamber, a valve operated by said piston for supplying fluid to the brake cylinder, ports controlled by said valve for supplying fluid to the application chamber upon movement from application position, and a yielding resistance for assisting the movement of the parts from application position to the position in which fluid is supplied to the application chamber.

In testimony whereof I have hereunto set my hand.

WALTER V. TURNER.

Witnesses:
A. M. CLEMENTS,
BARBARA HERBERT.

Copies of this patent may be obtained for five cents each, by addressing the "Commissioner of Patents, Washington, D. C."